United States Patent
Domeisen et al.

(10) Patent No.: US 10,779,124 B2
(45) Date of Patent: Sep. 15, 2020

(54) ARRANGEMENT FOR TRACKING THE SPATIAL POSITION OF DEVICES

(71) Applicant: Siemens Schweiz AG, Zürich (CH)

(72) Inventors: Patrik Domeisen, Knonau (CH); Oliver Zechlin, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 63 days.

(21) Appl. No.: 16/181,379

(22) Filed: Nov. 6, 2018

(65) Prior Publication Data

US 2019/0141483 A1    May 9, 2019

(30) Foreign Application Priority Data

Nov. 9, 2017 (DE) .................. 10 2017 219 910

(51) Int. Cl.
| | |
|---|---|
| H04W 4/029 | (2018.01) |
| H04W 4/02 | (2018.01) |
| G01S 5/02 | (2010.01) |

(52) U.S. Cl.
CPC .......... *H04W 4/029* (2018.02); *H04W 4/02* (2013.01); *H04W 4/023* (2013.01); *G01S 5/0252* (2013.01)

(58) Field of Classification Search
None
See application file for complete search history.

(56) References Cited

U.S. PATENT DOCUMENTS

| | | | | |
|---|---|---|---|---|
| 2002/0055362 A1 | | 5/2002 | Aoyama | 455/456.6 |
| 2003/0137396 A1 | * | 7/2003 | Durej | G05B 15/02 |
| | | | | 340/3.5 |
| 2011/0025469 A1 | * | 2/2011 | Erdmann | H04L 12/2809 |
| | | | | 340/10.1 |
| 2011/0312345 A1 | | 12/2011 | Nam | 455/456.2 |
| 2014/0211254 A1 | | 7/2014 | Takeuchi et al. | 358/1.15 |
| 2015/0198938 A1 | | 7/2015 | Steele et al. | 700/275 |
| 2017/0048189 A1 | * | 2/2017 | Humm | G06K 7/10366 |
| 2017/0181254 A1 | * | 6/2017 | Meitl | H05B 37/0272 |
| 2017/0230930 A1 | | 8/2017 | Frey | |
| 2017/0286889 A1 | * | 10/2017 | Yu | G06Q 10/063114 |
| 2018/0254835 A1 | * | 9/2018 | Breuer | H05B 37/0245 |
| 2018/0310176 A1 | * | 10/2018 | Abdelhakim | H04W 76/10 |
| 2019/0101377 A1 | * | 4/2019 | White | G01B 11/14 |

FOREIGN PATENT DOCUMENTS

| | | |
|---|---|---|
| DE | 10 2014 225 4 | 9/2015 |
| DE | 10 2016 201 8 | 8/2017 |
| EP | 3242091 B1 | 6/1918 |
| EP | 3 206 174 A1 | 8/2017 |
| GB | 2 298 099 A | 8/1996 |

* cited by examiner

*Primary Examiner* — German Viana Di Prisco

(74) *Attorney, Agent, or Firm* — Slayden Grubert Beard PLLC

(57) ABSTRACT

Various embodiments may include a method and/or arrangement for assigning the spatial position to a device, in particular in the context of the commissioning of the device (e.g. field device, actuator, sensor), wherein a positioning system is used to determine the spatial position of a mobile communication terminal located in the spatial vicinity of the device. The mobile communication terminal (e.g. smartphone) is configured to transmit the spatial position to the device and such that the transmission of the spatial position from the mobile communication terminal to the device only takes place when the device has been identified as an authorized receiver prior to transmission.

6 Claims, 3 Drawing Sheets

ARRANGEMENT FOR TRACKING THE SPATIAL POSITION OF DEVICES

CROSS-REFERENCE TO RELATED APPLICATIONS

This application claims priority to DE Application No. 10 2017 219 910.5 filed Nov. 9, 2017, the contents of which are hereby incorporated by reference in their entirety.

TECHNICAL FIELD

The present disclosure relates to tracking and management systems. Various embodiments may include methods and/or arrangements for assigning a spatial position to a device, in particular in the context of the commissioning of the device.

BACKGROUND

The number of pieces of technology and devices installed in buildings, e.g. sensors or actuators, is increasing. The installed technology for the most part possesses no "positional awareness", i.e. the installed technology or the installed devices cannot report the site at which they are located in a building to a higher-level system (e.g. building management system, control system, control room), e.g. for the creation of inventories. This causes high costs and effort, since this reporting for the most part has to take place manually.

In this context, the position of the devices may be captured manually by a service technician, usually in an imprecise manner. If this step has taken place, even with the risk that false data has been captured, the higher-level system knows about the installation site of the devices. However, if there is no communication channel from the higher-level system to the installed device, then said device (e.g. sensor, actuator, controller) may not know its own position. Without this information, the device may operate less efficiently. It is also difficult to perform maintenance or troubleshooting on the device efficiently, since the required manual reconciliation between a plan (setpoint position data) and the device in the field (actual position data) may be prone to errors.

SUMMARY

The teachings of the present disclosure may be embodied in methods and/or arrangements for assigning the spatial position to devices which are installed or are to be installed, wherein it is ensured that respective setpoint position data and actual position data of the respective devices match. For example, some embodiments may include methods comprising: determining the spatial position of a mobile communication terminal located in the spatial vicinity of the device by way of a positioning system; and transmitting the spatial position from the mobile communication terminal (e.g. smartphone, tablet computer) to the device.

As another example, some embodiments may include a method for assigning the spatial position (OPG) to a device (G), in particular in the context of the commissioning of the device (G), the method comprising: (VS1) Determining the spatial position (OPG) of a mobile communication terminal (MG) located in the spatial vicinity of the device (G) by way of a positioning system (IPS); and (VS2) Transmitting the spatial position (OPG) from the mobile communication terminal (MG) to the device (G).

In some embodiments, the transmission of the spatial position (OPG) from the mobile communication terminal (MG) to the device only takes place when the device (G) has been identified as an authorized receiver.

In some embodiments, the identification as an authorized receiver takes place by way of the device (G).

In some embodiments, the identification of the device (G) as an authorized receiver takes place by way of the mobile communication terminal (MG).

In some embodiments, the transmission of the spatial position (OPG) from the mobile communication terminal (MG) to the device (G) takes place via a third device (DG).

In some embodiments, the third device is a control center (LS), in particular a building management station or a BIM server.

In some embodiments, the third device (DG) is a device which is located in the immediate vicinity of the device (G), in particular at a distance of less than 1 m from the device (G).

In some embodiments, the transmission of the spatial position (OPG) from the mobile communication terminal (MG) to the device (G) comprises a signature, which is based on the spatial position (OPG) and an identification code of the device (G).

In some embodiments, the method includes (VS3) Querying a planned setpoint spatial position (SOPG) of the device (G) from a building model (BIM) recorded in a database (DB) by way of the mobile communication terminal (MG). The transmission of the spatial position (OPG) from the mobile communication terminal (MG) to the device (G) only takes place when the spatial position (OPG), ascertained by the positioning system (IPS), of the mobile communication terminal (MG) located in the spatial vicinity of the device (G) matches the planned setpoint spatial position (SOPG).

As another example, some embodiments include an arrangement configured to perform a method as described above.

As another example, some embodiments include an arrangement for assigning the spatial position (OPG) to a device (G), in particular in the context of the commissioning of the device (G), wherein the arrangement comprises: a positioning system (IPS) for determining the spatial position (OPG) of a mobile communication terminal (MG) located in the spatial vicinity of the device (G); and the mobile communication terminal (MG), configured for transmitting the spatial position (OPG) to the device (G). The mobile communication terminal (MG) is configured such that the transmission of the spatial position (OPG) from the mobile communication terminal (MG) to the device (G) only takes place when the device (G) has been identified as an authorized receiver prior to transmission.

In some embodiments, there is a building model (BIM) recorded in a database (DB), in which respective setpoint spatial positions (SOPG) of devices (G) which are installed or are to be installed are recorded.

BRIEF DESCRIPTION OF THE DRAWINGS

The teachings herein are discussed in light of the example embodiments shown in the following figures. In the drawings.

DETAILED DESCRIPTION

Figure 1:
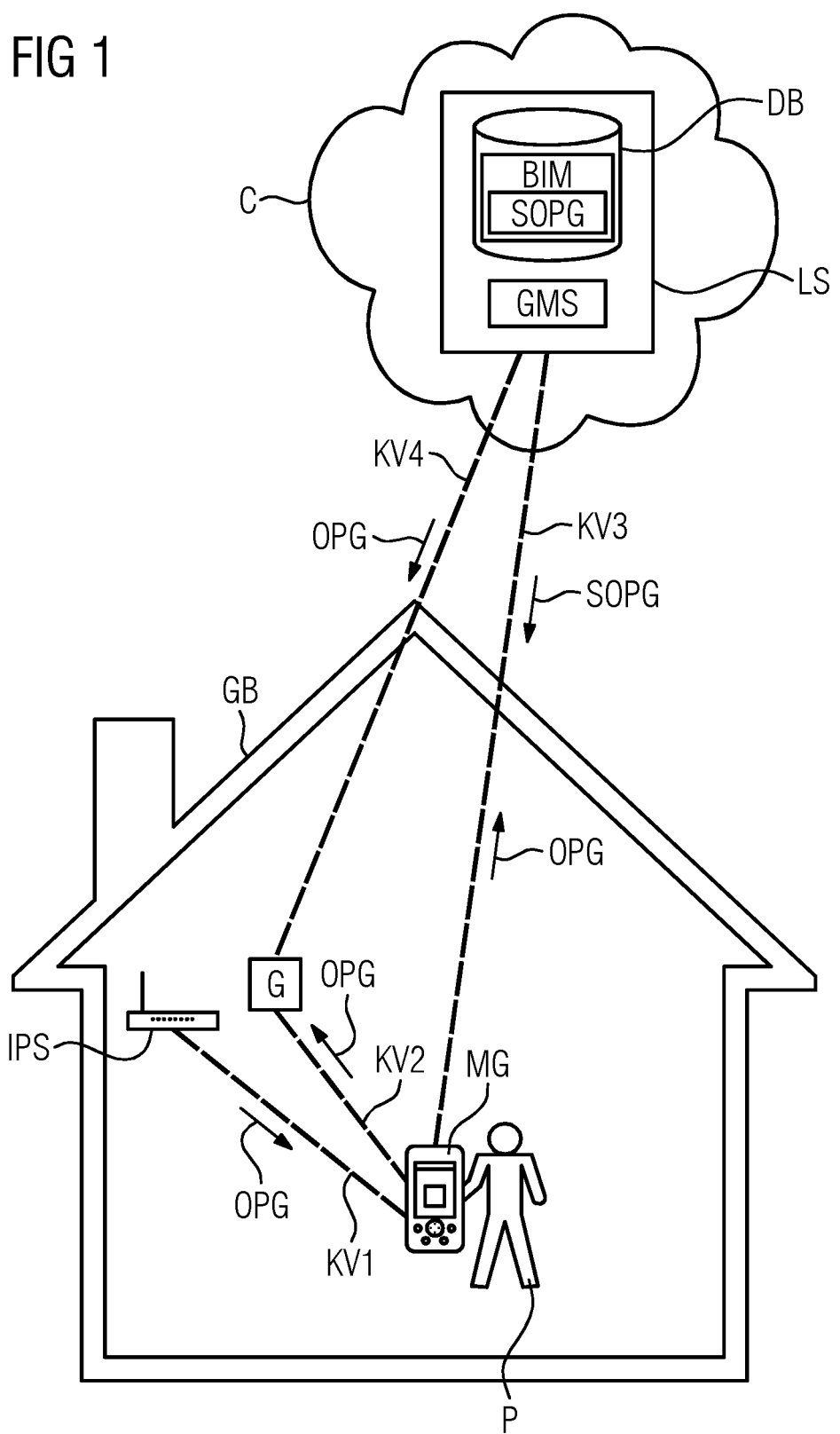
FIG. 1 shows a first arrangement for assigning the spatial position to a device, in particular in the context of the commissioning of the device, incorporating the teachings of the present disclosure.

Nowadays in intelligent buildings (Smart Homes), "distributed wireless connected devices" are not wired together directly. Thus, for example a light switch and the corresponding light fixture may only be linked to one another logically. For programming the relationship light switch-light fixture (assigning; logical linking) after installation, it is important that these devices are also located where they were planned. Specifically with devices actuated by radio (radio devices), spatial deviation has an influence on the functional quality and communication capability of said devices. If a device knows its spatial position, it can easily communicate and cooperate with other assigned devices. In some embodiments, the positioning system involves an indoor positioning system (e.g. WLAN, WLAN-ID of the WLAN access point, Bluetooth, IBeacons), which in any case is already installed in the building. Mobile communication terminals with corresponding communication mechanisms are nowadays widely used or can be easily retrofitted by corresponding apps.

If a device installed or to be installed in a building (e.g. field device, controller) knows its location information, i.e. the site at which it is located in the building, it can be connected to other devices in the building for example (e.g. integrated into a mesh network). Furthermore, in the event of an error, or during necessary maintenance, the device can report the location information to a service technician. This makes troubleshooting and maintenance easier. In some embodiments, a device is allocated or transmitted its location information (or its installation site) during the commissioning.

In some embodiments, the transmission of the spatial position from the mobile communication terminal to the device only takes place when the device has been identified as an authorized receiver. In some embodiments, there is an optical reconciliation between the mobile communication terminal and the device to be "injected" (i.e. the device, to which the spatial position is to be communicated). Using a corresponding QR code scanner or barcode scanner, the mobile communication terminal can read a corresponding marking attached to the device (e.g. QR code or barcode) and check whether the device is authorized (correct type, correct product line). By accessing the corresponding building model (BIM model), it is possible to use the mobile communication terminal to check whether the device is an authorized receiver. In some embodiments, a device may identify itself as authorized either directly (e.g. programming button) or via hardware or software as a "middle man" (e.g. dongle or online service).

In some embodiments, the identification as an authorized receiver takes place by way of the device. The corresponding device, or the corresponding product which is to be transmitted the position, can its readiness to receive by an acoustic or optical signal (e.g. flashing LED on the device/product), for example. The readiness to receive can also be communicated to the mobile communication terminal by a corresponding status message. This may take place via a radio or online connection within a corresponding piece of software or app, for example, advantageously also with a delivery receipt or OK message.

In some embodiments, the identification of the device as an authorized receiver may be effected by the mobile communication terminal. The mobile communication terminal may request that the corresponding device identify itself as authorized, e.g. by way of an NFC connection (e.g. Bluetooth). The device can output e.g. a corresponding acoustic or optical signal or respond to the mobile communication terminal with a receipt message. By accessing the corresponding building model (BIM model), it is possible to use the mobile communication terminal to check whether the device is an authorized receiver.

In some embodiments, the transmission of the spatial position from the mobile communication terminal to the device may be effected by a third device. Thus, the position data (spatial position) of the mobile communication terminal can be transferred from said mobile communication terminal to a testing device or installation tool, which in turn transfers the received position to the actual device or product. This is particularly advantageous in brownfield projects.

In some embodiments, the third device comprises a control center, in particular a building management station or a BIM server. In some embodiments, the mobile communication terminal also transfers a spatial position assigned or transmitted to a device to a higher-level point, such as a control center or building management system for example, to store the location information in a building information model (BIM model). From the control center (e.g. building management station, BIM server, building management system), the spatial position can be forwarded to the corresponding device. Thus, it is inter alia ensured that the spatial position allocated and transmitted to the device matches the corresponding spatial position recorded in the building information model (BIM model).

In some embodiments, in the third device comprises a device which is located in the immediate spatial vicinity of the device, in particular at a distance of less than 1 m from the device. In some embodiments, the device is unable to establish its own connection to the mobile communication terminal, but can, however, connect to the third device located in the vicinity of the device. In some embodiments, the device and the third device are connected by a communication network (e.g. installation bus or mesh network), whereby these are able to communicate. At a shorter distance, in particular at a distance of less than 1 m between the device and the third device, it is possible that near field communication (NFC, e.g. RFID, Bluetooth) can be used.

In some embodiments, the transmission of the spatial position from the mobile communication terminal to the device comprises a signature, which is based on the spatial position and an identification code (e.g. unique ID) of the device. This ensures a secure transmission of the spatial position from the mobile communication terminal to the device. A digital signature may be created by a digital signature process (e.g. by an asymmetrical cryptosystem or a public key cryptosystem), for example.

In some embodiments, a method comprises querying a planned setpoint spatial position of the device from a building model (BIM, building information model) recorded in a database by way of the mobile communication terminal. In some embodiments, the transmission of the spatial position from the mobile communication terminal to the device only takes place when the spatial position, ascertained by the positioning system, of the mobile communication terminal located in the spatial vicinity of the device matches the planned setpoint spatial position. This ensures that the setpoint spatial position of the device, as recorded in the building model (BIM, building information model), matches the physical spatial position of the device in the field (i.e. in the building).

The setpoint target position of the device to be "injected" (e.g. smoke alarm) may be recorded in a database (e.g. BIM model). Said setpoint target position may be transmitted to the communication terminal. This may be a technical drawing (CAD), for example. If the setpoint target position matches the actual target position, or only has a defined deviation (e.g. a deviation of a maximum of 3 m, in particular a maximum of 1 m), then this recorded setpoint target position is transmitted to the device to be "injected".

In some embodiments, an arrangement may be configured for carrying out the methods described above. A corresponding arrangement can be realized by hardware and software components which are already present in any case, or fitted with commercially available components (e.g. smartphone, server, memory, communication mechanisms (e.g. WLAN, Internet)), in order to realize the method according to the invention.

In some embodiments, an arrangement for assigning the spatial position to a device, in particular in the context of the commissioning of the device, comprises: a positioning system for determining the spatial position of a mobile communication terminal (e.g. smartphone) located in the spatial vicinity of the device; and the mobile communication terminal configured to transmit the spatial position to the device. In some embodiments, the mobile communication terminal is configured such that the transmission of the spatial position from the mobile communication terminal to the device only takes place when the device has been identified as an authorized receiver prior to transmission. The arrangement may be realized by hardware and software components which are already present in any case, or a present infrastructure may be equipped with commercially available components (e.g. smartphone, server, memory, communication mechanisms (e.g. WLAN, Internet)), in order to form a corresponding arrangement.

In some embodiments, the arrangement comprises a building model (BIM, building information model) recorded in a database, in which model the respective setpoint spatial positions of devices which are installed or are to be installed are recorded. The mobile communication terminal can use corresponding communication connections (e.g. radio, WLAN, Internet) to access the building model and e.g. carry out checks between the setpoint data recorded in the building model and the actual data present in the field.

FIG. 1 shows a first example arrangement for assigning the spatial position to a device G, in particular in the context of the commissioning of the device G within a building management system GMS. The first exemplary arrangement comprises: a positioning system IPS for determining the spatial position OPG of a mobile communication terminal MG located in the spatial vicinity of the device G; and a mobile communication terminal MG, configured for transmitting the spatial position OPG to the device G. The mobile communication terminal MG is configured such that the transmission of the spatial position OPG from the mobile communication terminal MG to the device G only takes place when the device G has been identified as an authorized receiver prior to transmission.

In some embodiments, there is a building model BIM recorded in a database DB in which respective setpoint spatial positions SOPG of devices G which are installed or are to be installed are recorded. The person P involves a service technician, for example, who is tasked with installing a device G (e.g. sensor, actuator, controller, fire alarm, thermostat, etc.) in the building GB.

Using the positioning system IPS, the spatial position OPG of the mobile communication terminal MG (e.g. smartphone, tablet computer) of the person P located in the spatial vicinity of the device G is ascertained. The positioning system IPS involves an indoor positioning system (WLAN, Bluetooth, IBeacon, etc.) or a satellite-supported positioning system (e.g. GPS, Galileo), for example. The spatial position OPG is transmitted to the mobile communication terminal MG of the user P via a suitable communication connection KV1 and, in some embodiments, there is shown on the display of the mobile communication terminal MG. The communication connection KV1 involves a wireless connection (e.g. radio, WLAN, Bluetooth, NFC (Near Field Communication)), for example.

In some embodiments, the mobile communication terminal MG is configured to transmit the spatial position OPG to the device G via a suitable communication connection KV2 (e.g. radio, WLAN, Bluetooth, NFC (Near Field Communication)). In some embodiments, the mobile communication terminal MG only transmits the spatial position OPG to the device G when the device G has been identified as an authorized receiver. The identification of the device G as an authorized receiver of the spatial position OPG can be affected, for example, via a reconciliation of the device data with corresponding data relating to the device, which is recorded in the building model BIM. The mobile communication terminal MG may, for example, use a corresponding QR code scanner or barcode scanner to read a corresponding marking attached to the device (e.g. QR code or barcode) and check whether the device G is authorized (correct type, correct product line). By accessing the corresponding building model (BIM model), the mobile communication terminal MG can be used to check whether the device G is an authorized receiver. In this context, the mobile communication terminal MG (e.g. smartphone, tablet computer) is connected to the control center LS via a suitable communication connection KV3 (e.g. wireless radio connection or satellite-supported connection).

In some embodiments, the transmission of the spatial position OPG from the mobile communication terminal MG to the device G comprises a signature, which is based on the spatial position OPG and an identification code (e.g. unique ID) of the device.

In some embodiments, the control center LS comprises a building management system GMS, which has access to a database DB, in which the building model BIM of the building GB is recorded. The control system LS comprises a high-performance and correspondingly configured server for the operation of the building management system GMS. The database DB may involve an in-memory database or a relational database, for example. The building model BIM is described in a suitable notation and recorded in the database DB. Advantageously, the control system LS is realized in a cloud infrastructure C.

In some embodiments, the identification as an authorized receiver takes place by way of the device G. The identification of the device G as an authorized receiver can also take place by way of the mobile communication terminal MG or in a collaboration between the device G, the mobile communication terminal MG and the control center LS.

The transmission of the spatial position OPG from the mobile communication terminal MG to the device G can take place in a direct connection KV2 between the mobile communication terminal MG and the device G (e.g. actuator, sensor, controller), or also indirectly via a third device. The third device may be the control center LS, in particular a building management station or a BIM server, for example. The mobile communication terminal MG can transfer the spatial position OPG to the control center LS, to enter this into the building model BIM. The control center LS can compare the obtained spatial position OPG (i.e. the actual spatial position) with a setpoint spatial position SOPG recorded in the building model BIM and, if there are deviations, signal a corresponding message to a building operator or facility manager. The control center LS can transmit the spatial position OPG to the device G via a suitable communication connection KV4 (e.g. wireless connection). In some embodiments, a reconciliation between the corresponding setpoint spatial position SOPG and the spatial position OPG takes place prior to the transmission.

In some embodiments, the planned setpoint spatial position SOPG of the device G from a building model BIM recorded in a database DB is queried by the mobile communication terminal MG, in particular after a request (on demand) by the mobile communication terminal MG; wherein a transmission of the spatial position OPG from the mobile communication terminal MG to the device G only takes place when the spatial position OPG, ascertained by the positioning system IPS, of the mobile communication terminal MG located in the spatial vicinity of the device G matches the planned setpoint spatial position SOPG. The reconciliation of the setpoint spatial position SOPG with the spatial position OPG ascertained by the positioning system IPS (i.e. the actual spatial position) can be effected by a correspondingly configured mobile communication terminal MG or by corresponding mechanisms of the control center LS or of the building management system GMS.

Figure 2:
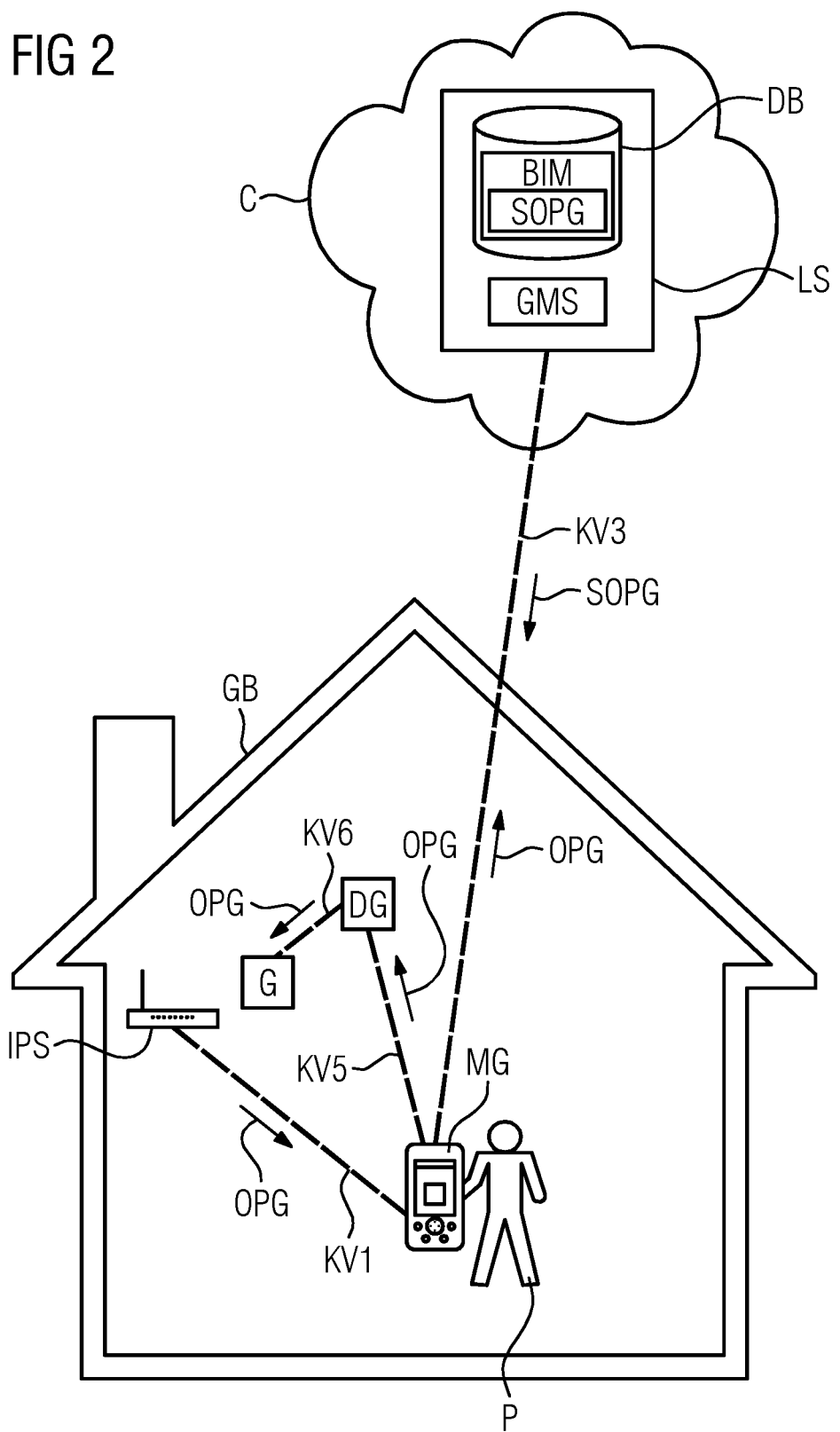
FIG. 2 shows a second arrangement for assigning the spatial position to a device, in particular in the context of the commissioning of the device, incorporating the teachings of the present disclosure.

FIG. 2 shows a second example arrangement for assigning the spatial position OPG to a device G (e.g. field device, actuator, sensor, controller), in particular in the context of the commissioning of the device G for a building management system GMS. The arrangement in accordance with FIG. 2 comprises a positioning system IPS for determining the spatial position OPG of a mobile communication terminal MG located in the spatial vicinity of the device G and a mobile communication terminal MG, configured to transmit the spatial position OPG to the device G. The mobile communication terminal MG is configured such that the transmission of the spatial position OPG from the mobile communication terminal MG to the device G only takes place when the device G has been identified as an authorized receiver prior to transmission.

Using the positioning system IPS, the spatial position OPG of the mobile communication terminal MG (e.g. smartphone, tablet computer) of the person P located in the spatial vicinity of the device G is ascertained. The positioning system IPS involves an indoor positioning system (WLAN, Bluetooth, IBeacon, etc.) or a satellite-supported positioning system (e.g. GPS, Galileo), for example. The spatial position OPG is transmitted to the mobile communication terminal MG of the user P via a suitable communication connection KV1 and may be shown on the display of the mobile communication terminal MG. The communication connection KV1 involves a wireless connection (e.g. radio, WLAN, Bluetooth, NFC (Near Field Communication)), for example.

In some embodiments, the arrangement in accordance with FIG. 2 comprises a building model BIM recorded in a database DB, in which respective setpoint spatial positions SOPG of devices G which are installed or are to be installed are recorded. The database DB is, for example, part of a building management system GMS or a control center LS.

The identification of the device G as an authorized receiver of the spatial position OPG can be affected, for example, via a reconciliation of the device data with corresponding data relating to the device G, which is recorded in the building model BIM. The mobile communication terminal MG may, for example, use a corresponding QR code scanner or barcode scanner to read a corresponding marking attached to the device (e.g. QR code or barcode) and check whether the device G is authorized (correct type, correct product line). By accessing the corresponding building model (BIM model), the mobile communication terminal MG can be used to check whether the device G is an authorized receiver. In this context, the mobile communication terminal MG (e.g. smartphone, tablet computer) is connected to the control center LS via a suitable communication connection KV3 (e.g. wireless radio connection or satellite-supported connection).

The transmission of the spatial position OPG from the mobile communication terminal MG to the device G can also take place via a third device DG (e.g. a testing device). In some embodiments, the third device DG is located in the immediate spatial vicinity of the device G, in particular at a distance of less than 1 m from the device. This indirect transmission of the spatial position OPG from the mobile communication terminal MG to the device G is advisable particularly in those cases in which there is no direct or no adequate connection between the device G and the mobile communication terminal MG (e.g. smartphone), or no such connection can be made. In such cases, in a first step the spatial position OPG is transferred from the mobile communication terminal MG to the third device DG (e.g. a testing device or a suitable further field device (e.g. fire alarm, thermostat)) and from the third device DG onward to the device G, via suitable communication connections KV5, KV6. The communication connections KV5, KV6 may involve wireless connections (e.g. radio connections).

Figure 3:
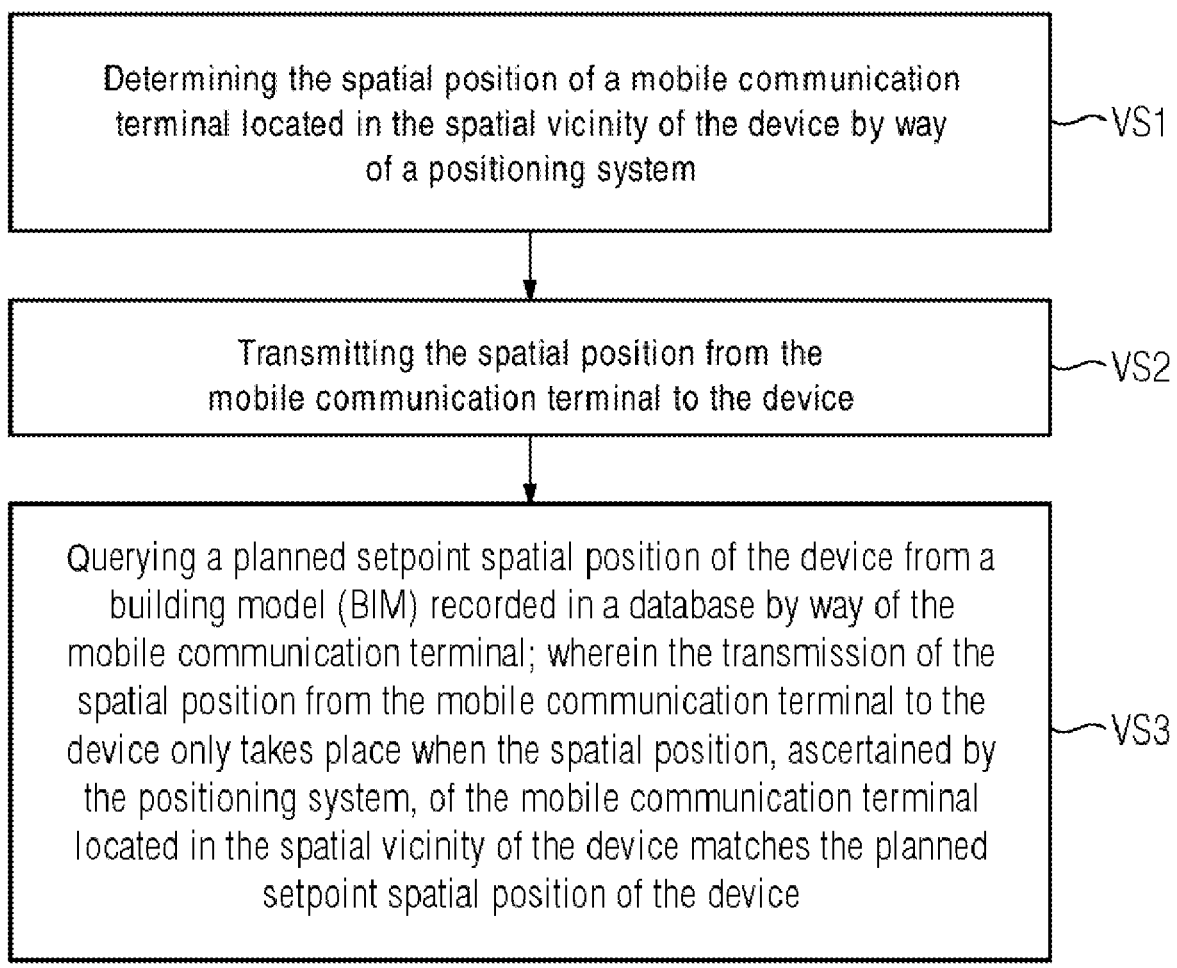
FIG. 3 shows an flow diagram for a method for assigning the spatial position to a device, in particular in the context of the commissioning of the device, incorporating the teachings of the present disclosure.

FIG. 3 shows an exemplary flow diagram for a method for assigning the spatial position to a device (e.g. field device for building automation; actuator, sensor, controller), in particular in the context of the commissioning of the device. The method comprises: (VS1) determining the spatial position of a mobile communication terminal (e.g. smartphone, tablet computer) located in the spatial vicinity of the device by way of a positioning system (e.g. satellite-supported positioning system (e.g. GPS, Galileo) and/or indoor positioning system (e.g. WLAN, BLE, IBeacons)); and (VS2) transmitting the spatial position from the mobile communication terminal to the device.

Optionally, the method furthermore comprises (VS3) querying a planned setpoint spatial position of the device from a building model (e.g. building information model, BIM) recorded in a database by way of the mobile communication terminal; wherein the transmission of the spatial position from the mobile communication terminal to the device only takes place when the spatial position, ascertained by the positioning system, of the mobile communication terminal located in the spatial vicinity of the device matches the planned setpoint spatial position.

A corresponding method can be realized by hardware and software components which are in any case already present in a building or in the context of a building automation. It is also easily possible to fit or equip a building or a building automation with commercially available components (e.g. smartphone, server, memory, communication mechanisms (e.g. WLAN, Internet)), to realize the method according to the invention. In some embodiments, the method is realized by a cloud infrastructure. Thus, for example a building control center can be realized in a computer cloud with corresponding hardware, software and communication mechanisms (Internet, WLAN, server, database for BIM, etc.) for communication into the field or into the building. The building control center may comprise a building management system, which maintains or monitors the entries and the access to the building information model.

In some embodiments, the transmission of the spatial position from the mobile communication terminal to the device only takes place when the device has been identified as an authorized receiver. This can be affected, for example, by reconciling the data at the physical device (e.g. serial number, type, etc.) with the corresponding data recorded in the BIM model. The BIM model can be based on Industry Foundation Classes (IFC), for example, or another corresponding notation. The identification as an authorized receiver can take place by way of the device or by way of the mobile communication terminal, e.g. by corresponding checks and reconciliations with corresponding entries in the BIM model.

The transmission of the spatial position from the mobile communication terminal to the device can be affected indirectly via a third device (e.g. server in the cloud or via a testing device in the field). The third device may be a control center, in particular a building management station or a BIM server. The third device may also be located in the immediate spatial vicinity of the device, in particular at a distance of less than 1 m from the device.

In some embodiments, the transmission of the spatial position from the mobile communication terminal to the device comprises a signature, which is based on the spatial position and an identification code (e.g. unique ID) of the device. This increases the security of the transmission, in particular impedes or prevents a "Man-in-the-middle attack" (MITM attack).

The "positional awareness" of a mobile communication terminal (e.g. smartphone of a service technician) includes using the recognized or known position of the communication terminal is forwarded or programmed to a device or product (e.g. building technology sensor). Optionally, said spatial position (in that case device/product position) can be furthermore transmitted to the "system" by the communication terminal, without there having to be a communication channel between the product/device and the "system" (e.g. building management software, building management system).

A communication terminal, e.g. a smartphone, recognizes its position. This position recognition is effected for example via GPS, indoor navigation infrastructure, camera-based environment recognition (reconciling camera image with image database of the environment) or point cloud matching, advantageously from a combination of various information ("sensor fusion"). In this context, a coordinate, advantageously including the Z-axis, is established or defined (e.g. via barometer, known construction plans (ceiling height), the Earth's magnetic field, radio signal evaluation, etc.). For example, this may be a value based on a standard (e.g. ID value, e.g. WGS84 or UTM coordinate (World Geodetic System 1984/Universal Transverse Mercator), or even a location-specific ID (identification) in which a corner of a building is defined as a zero point, for example.

In the next step, said positional coordinate is transmitted to the device/product (e.g. a sensor). Optionally, the device/product which is to receive the position announces its readiness to receive (acoustic or optical signal; or as a status message via a radio or online connection within a software system (e.g. app)). This may optionally also be with a delivery receipt or OK message. In some embodiments, the devices/products identify themselves as authorized, either directly (e.g. programming button, or via hardware or software as a "middle man" (e.g. dongle or online service), e.g. by an optical reconciliation (e.g. by reading a QR code or barcode)).

Possible Sequence:
  a) Determine the position of the mobile communication device, or have it determined;
  b) Identify the devices or product to be "injected" (i.e. identify the device or product, to which the spatial position is to be transmitted);
  c) Transmit the determined position to the device/product;
  d) Transmit the "injected" position to management level (i.e. transmit the spatial position transmitted to the device/product to a higher-level management level (e.g. building control center, building management system, building control station).

More Ways to Inject the Position (to Transmit the Spatial Position to the Device/Product) are Possible:
  By means of wireless near field communication; e.g. NFC or Bluetooth with low signal strength: in this context, the communication terminal is held up to the device/product to be "injected" and the position (spatial position) is transferred or programmed. This is a highly secure approach, as the "wireless bridge" cannot be compromised.
  By means of radio technology with greater coverage, such as Bluetooth, WiFi, LTE for example; in this context, contact between communication terminal and device/product is not necessary.
  By means of mechanical contact (e.g. plug/socket).
  By means of programming by "the system" (back-end; e.g. management station): Prior to the transmission to the device/product (e.g. building technology sensor), this has obtained the position of the communication terminal (and thus of the product at the instant of the transfer). In this context, a wired or wireless connection is used to establish a connection between the "system" (e.g. building management system) and the device/product x or a second device/product y+1, which is able to communicate with product x, and to transmit the position (spatial position) of device/product x. If the position transmission to y+1 takes place, this subsequently transfers the position to x (cascaded transfer), and/or respectively manages the position of x itself (e.g. as a master in a mesh network). Furthermore, the position of a new or additional product/device could be determined or reconciled on the basis of the position of already available products/devices.

Some Embodiments of the Present Disclosure May in Particular Provide:
  More efficient commissioning (commissioning of field devices in buildings);
  Reducing the probability of error when capturing devices/products (human error);
  Added value due to "positional awareness" (e.g. logical or position-based "awareness" (perception, consideration) or due to functional clusters);
  Process (of position injection, i.e. the transfer of the position) can proceed in automated or semi-automated steps (e.g. position data of a communication terminal is transferred to a testing device or installation tool, which in turn transfers the received position to the actual product; this is particularly advantageous in the brown approach (consideration of existing structures);

It is possible to add the product and its position to an inventory in the back-end (server; cloud; optionally also locally on the device of the technician at the assignment site). This may be a management system, any kind of database or a BIM-compliant building tool, for example. Should the position of the product change, the position captured at that location can be dynamically adapted after transferring once more.

The device/product can share its "knowledge" of its position with other devices or products located in the vicinity and exchange position-specific findings/capabilities (geoposition logic cluster). One example would be influencing the room climate at the correct position.

The position can be encrypted, so that only the product owner can read/use the position. Available in this manner, semantic information relating to the environment can be added to the pure position in the back-end (e.g. "conference room"; "suspended ceiling"; environment sensors x y z). p1 "Sanity check", i.e. plausibility checks are possible: if a (new) position of a device is transmitted, it is possible to establish on the part of the management software whether this position
a) is realistic (i.e. not erroneous) and/or
b) is logically sensible or feasible (i.e. for example, a sensor only works sensibly in connection with the sensors located in the direct vicinity; is this sensor in such an environment?);

Cost savings and productivity increase in service (e.g. troubleshooting and during commissioning);

Data quality of the digital twin increases (BIM);

More specific and more precise provision of data point information for back-end systems, e.g. for a cloud platform.

REFERENCE CHARACTERS

IPS Positioning system
GB Building
GMS Building management system
DB Database
LS Control center
MG Mobile device
OPG Spatial position
SOPG Setpoint spatial position
BIM Building model
P Person
KV1-KV6 Communication connection
C Cloud
G Device
DG Third device
VS1-VS3 Method step

The invention claimed is:

1. A method for assigning a spatial position to a device, the method comprising:
   determining a current spatial position of a mobile communication terminal located in a spatial vicinity of the device by way of a positioning system;
   reading a marking attached to the device to determine whether the device is authorized; and
   in response to a determination the device is authorized, transmitting a signature from the mobile communication terminal to the device via a third device, the signature including the current spatial position and an identification code of the device;
   wherein the third device is disposed at a distance from the device of less than 1 meter.

2. The method as claimed in claim 1, wherein the third device comprises a control center, a building management station, and/or a BIM server.

3. The method as claimed in claim 1, further comprising querying a planned setpoint spatial position of the device from a building model recorded in a database with the mobile communication terminal; and
   checking whether the spatial position matches the planned setpoint spatial position;
   wherein transmitting the spatial position from the mobile communication terminal to the device only takes place if the spatial position matches the planned setpoint spatial position.

4. A system comprising:
   a device;
   a positioning system associated with a mobile communication terminal determining a current spatial position of the mobile communication terminal; and
   a third device;
   wherein the mobile communication terminal determines whether the terminal is located in a spatial vicinity of the device with the positioning system, reads a marking attached to the device to determine whether the device is authorized, and in response to a determination the device is authorized, transmits a signature from the mobile communication terminal through the third device to the device, the signature including the current spatial position and an identification code of the device;
   wherein the third device is disposed at a distance from the device of less than 1 meter.

5. A system for assigning the spatial position to a device, the system comprising:
   a positioning system for determining a spatial position of a mobile communication terminal located in a spatial vicinity of the device;
   an intermediate device; and
   the mobile communication terminal configured to transmit the spatial position to the device;
   wherein the mobile communication terminal reads a marking attached to the device to determine whether the device is authorized, and in response to a determination the device is authorized, transmits a signature from the mobile communication terminal through the intermediate device to the device, the signature including the current spatial position and an identification code of the device;
   wherein the intermediate device is disposed at a distance of less than 1 meter from the device.

6. The arrangement as claimed in claim 5, further comprising a building model stored in a database, in which respective setpoint spatial positions of devices which are installed or are to be installed are recorded.

* * * * *